2,989,534
PROCESS OF MAKING 2-CYANOPYRIDINES
Francis E. Cislak, Indianapolis, Ind., assignor to Reilly Tar & Chemical Corporation, Indianapolis, Ind., a corporation of Indiana
No Drawing. Filed Oct. 8, 1959, Ser. No. 845,080
3 Claims. (Cl. 260—294.9)

This invention relates to a new process for the manufacture of 2-cyanopyridines. More particularly, it relates to the preparation of 2-cyanopyridines from 2-methylpyridine-N-oxides.

In general, my process comprises reacting a 2-methylpyridine-N-oxide with an acyl nitrite or an aroyl nitrite:

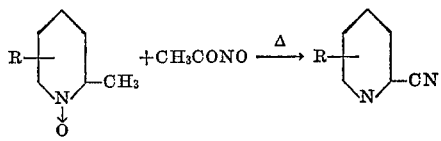

wherein R is hydrogen or lower alkyl.

My process will be described more fully in conjunction with the following specific examples:

EXAMPLE 1

*2-cyanopyridine*

To one liter of a chloroform solution containing 100 grams of 2-picoline-N-oxide there is added 200 grams of finely divided silver nitrite. While agitating and cooling the above mixture, there is added to it 100 grams of acetyl chloride. The acetyl chloride is added slowly and in small portions; after all of it has been added, the stirring is continued for about one hour longer. Then one liter of n-butyl alcohol is added and the chloroform removed by fractional distillation. The resulting butyl alcohol mixture is heated under reflux conditions for about 1–2 hours. Then the mixture is evaporated to dryness. The residue is made basic with aqueous ammonia and the 2-cyanopyridine is recovered from this solution by extraction with benzene. From the benzene extract the 2-cyanopyridine may be recovered in any convenient manner, such as by distillation. The 2-cyanopyridine boils at about 210° C.

Instead of making my acetylnitrite by the interaction of silver nitrite and acetyl chloride, I may make it by the interaction of silver acetate and nitrosyl chloride.

While I prefer to use acetylnitrite, I may use other acyl nitrites, such as propionylnitrite; or I may use an aroyl nitrite, such as benzoyl nitrite.

In place of the butyl alcohol, I may use other polar solvents, such as ethylene glycol.

EXAMPLE 2

*2-cyano-4-methylpyridine*

The procedure of Example 1 is repeated with the exception that I use 2,4-lutidine-N-oxide in place of the 2-picoline-N-oxide, and I recover 2-cyano-4-methylpyridine.

EXAMPLE 3

*2-cyano-5-ethylpyridine*

The procedure of Example 1 is repeated with the exception that I use 2-methyl-5-ethylpyridine-N-oxide in place of the 2-picoline-N-oxide and I recover 2-cyano-5-ethylpyridine.

EXAMPLE 4

*2-cyano-3-methylpyridine*

The procedure of Example 1 is repeated with the exception that I use 2,3-lutidine-N-oxide in place of the 2-picoline-N-oxide and I recover 2-cyano-3-methylpyridine.

EXAMPLE 5

*2-cyano-6-methylpyridine*

The procedure of Example 1 is repeated with the exception that I use 2,6-lutidine-N-oxide in place of 2-picoline-N-oxide, and I recover 2-cyano-6-methylpyridine. A small amount of 2,6-dicyanopyridine is formed.

In my co-pending application Serial Number 828,032 filed July 20, 1959, now Patent Number 2,943,091 issued June 28, 1960, I disclose and claim a process of preparing higher alkyl-2-cyanopyridines and higher alkyl-4-cyanopyridines. In that application I teach the preparation of higher alkyl-2-cyanopyridines by the interaction of an alkali metal cyanide with a quaternary salt of a higher alkylpyridine-N-oxide. Thus, from 3-ethylpyridine-N-oxide, I form a 2-cyano-3-ethylpyridine together with some 2-cyano-5-ethylpyridine. The process of my instant application affords a convenient way of preparing 2-cyano-5-ethylpyridine from the readily available 2-methyl-5-ethylpyridine. The ease of oxidizing the ethyl group of 2-cyano-5-ethylpyridine makes this a most useful compound for the preparation of 2-substituted nicotinic acid derivatives which are undergoing extensive studies on cholesterol build-up.

I claim as my invention:

1. The process of preparing 2-cyanopyridines which comprises mixing a solution of a 2-methylpyridine-N-oxide with a compound of the class consisting of acetyl nitrite, propionylnitrite and benzoyl nitrite and heating the resultant mixture.

2. The process of preparing 2-cyano-5-ethylpyridine which comprises mixing a solution of 2-methyl-5-ethylpyridine-N-oxide with acetyl nitrite and heating the resultant mixture.

3. The process of preparing 2-cyano-5-ethylpyridine which comprises mixing a silver nitrite with a solution of 2-methyl-5-ethylpyridine-N-oxide, adding acetyl chloride to the mixture, heating the resultant mixture, and recovering the 2-cyano-5-ethylpyridine formed.

References Cited in the file of this patent

UNITED STATES PATENTS 2,736,739    England et al. _____ Feb. 28, 1956